United States Patent [19]
Schmider et al.

[11] Patent Number: 5,262,703
[45] Date of Patent: Nov. 16, 1993

[54] LOW NOISE MINIATURE ELECTRIC MOTOR

[75] Inventors: Fritz Schmider, Hornberg; Thomas Von Der Heydt, St. Georgen, both of Fed. Rep. of Germany

[73] Assignee: Papst Licensing GmbH, Spaichingen, Fed. Rep. of Germany

[21] Appl. No.: 874,796

[22] Filed: Apr. 28, 1992

Related U.S. Application Data

[60] Division of Ser. No. 522,603, May 11, 1990, Pat. No. 5,109,171, which is a continuation-in-part of Ser. No. 419,872, Oct. 11, 1989, abandoned.

[30] Foreign Application Priority Data

Apr. 7, 1989 [DE] Fed. Rep. of Germany ... 8904389[U]
May 11, 1989 [DE] Fed. Rep. of Germany ....... 3915356

[51] Int. Cl.$^5$ ............................................. H02K 29/14
[52] U.S. Cl. .................................. 318/138; 318/254; 318/463
[58] Field of Search ............... 318/138, 254, 439, 463, 318/652, 653; 388/912

[56] References Cited

U.S. PATENT DOCUMENTS

| | | | |
|---|---|---|---|
| 3,373,328 | 3/1968 | Hobo | 318/254 |
| 3,891,905 | 6/1975 | Müller | 318/254 |
| 4,011,475 | 3/1977 | Schmider | 318/254 |
| 4,028,598 | 6/1977 | Bergmans | 318/138 |
| 4,065,706 | 12/1977 | Gosling et al. | 318/254 |
| 4,374,347 | 2/1983 | Müller | 318/138 |
| 4,667,137 | 5/1987 | Macleod | 318/254 |

*Primary Examiner*—Bentsu Ro
*Attorney, Agent, or Firm*—Fitch, Even, Tabin & Flannery

[57] ABSTRACT

A low noise brushless dc motor has a rotor with a permanent magnet and a stator with a bearing system mounting a shaft for rotating the rotor. The motor has an operating circuit that includes a tachometer winding connected to the base of a first transistor whose collector is in series with a first resistor. The other end of the tachometer winding is connected to the base of a second transistor whose collector is in series with a second resistor.

4 Claims, 3 Drawing Sheets

LOW NOISE MINIATURE ELECTRIC MOTOR

This is a division of application Ser. No. 07/522,603, filed May 11, 1990, now U.S. Pat. No. 5,109,171, issued Apr. 28, 1992, which is a continuation-in-part of U.S. Ser. No. 419,872 filed Oct. 11, 19891, abandoned.

The present invention concerns a low noise miniature electric motor.

A single coil motor of this type is known from disclosure DE OS 22 60 069 and a similar motor also has been described in the utility document DE GM 87 02 271.

Motors of this type, which may be installed in road vehicles or office equipment, are generally enclosed in a sheet metal housing, which tends to produce mechanical and acoustic vibration. Vibration preferably should be avoided, if possible, while at the same time low-cost manufacture remains a requirement.

An arrangement is already known from disclosure document DE OS 35 28 121 in which a lateral force is exerted on a single or multiple surface bushing, used to provide accurate guidance of a plain bearing, in order to generate a so-called secondary force to diminish rotational fluctuation in the space between the two bearing halves. However, this arrangement requires a level of complexity which does not appear justified for motors of this type in the context of the solution concerned in this case, and it would therefore be a disadvantage.

The disclosure DE OS 38 08 222 describes a particularly flat dc motor in which the asymmetric arrangement of the stator stirrup exerts a lateral force on the bearing as well, whereby its arrangement at the extremity however produces so-called edge running, i.e. the shaft is displaced on one edge in the bearing.

A simple brushless motor with a flat air gap is known from disclosure DE OS 28 04 549. When a motor of this type is operated in a vertical construction without lateral bearing loads, it tends to produce a considerable amount of noise. The purpose of the present invention to reduce or eliminate this effect by the simplest possible means. Even though the remaining structure of this device does not tend to produce resonant vibration, the objective is to achieve very smooth running.

Thus, the purpose of the present invention is to provide a motor within the wider concept, of particularly simple construction, as characterized in this concept, whereby the production of noise and resonance is eliminated, or at least drastically reduced, in a design according to this wider concept which is cost-effective in itself and easy to assemble as a high volume product.

The solution to this problem is obtained by the provision of an asymmetric arrangement of the components of the magnetic circuit with respect to the rotor axis, and in particular, of the ferromagnetic components of the stator.

Further details and preferred further embodiments of the present invention are provided in the description which follows and in the drawings.

Figure 1:
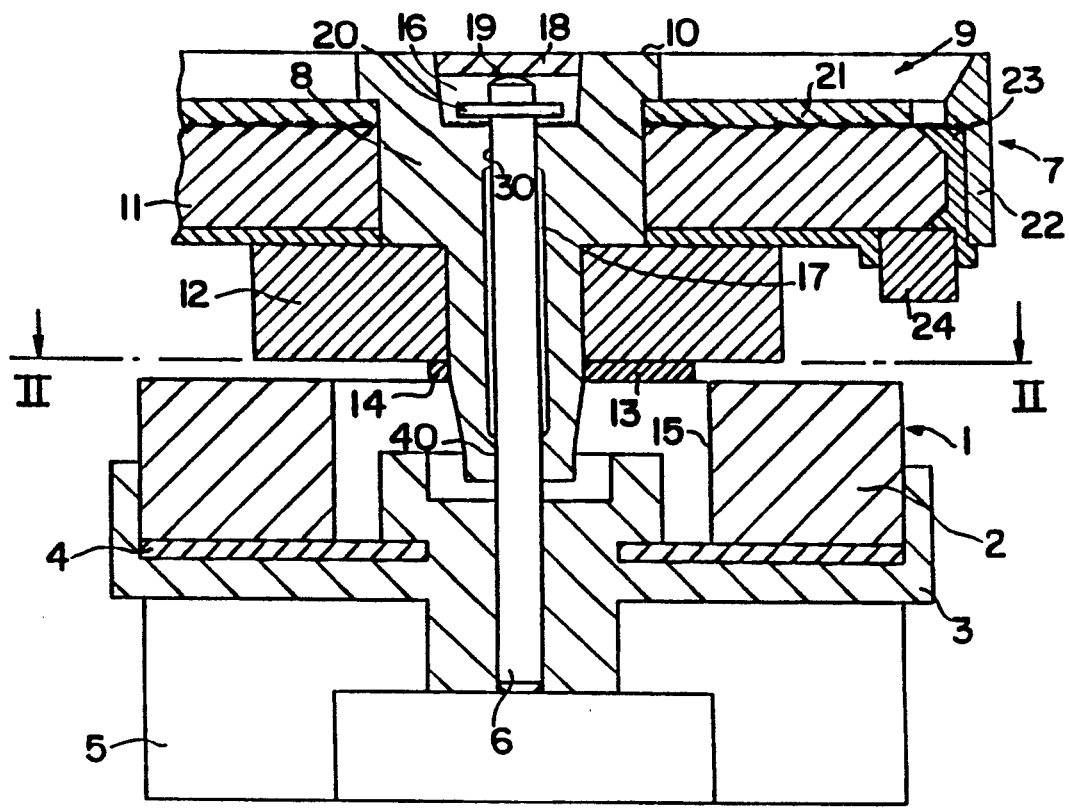
FIG. 1 is an enlarged cross section of a motor according to the present invention with a flat air gap.
Figure 2:
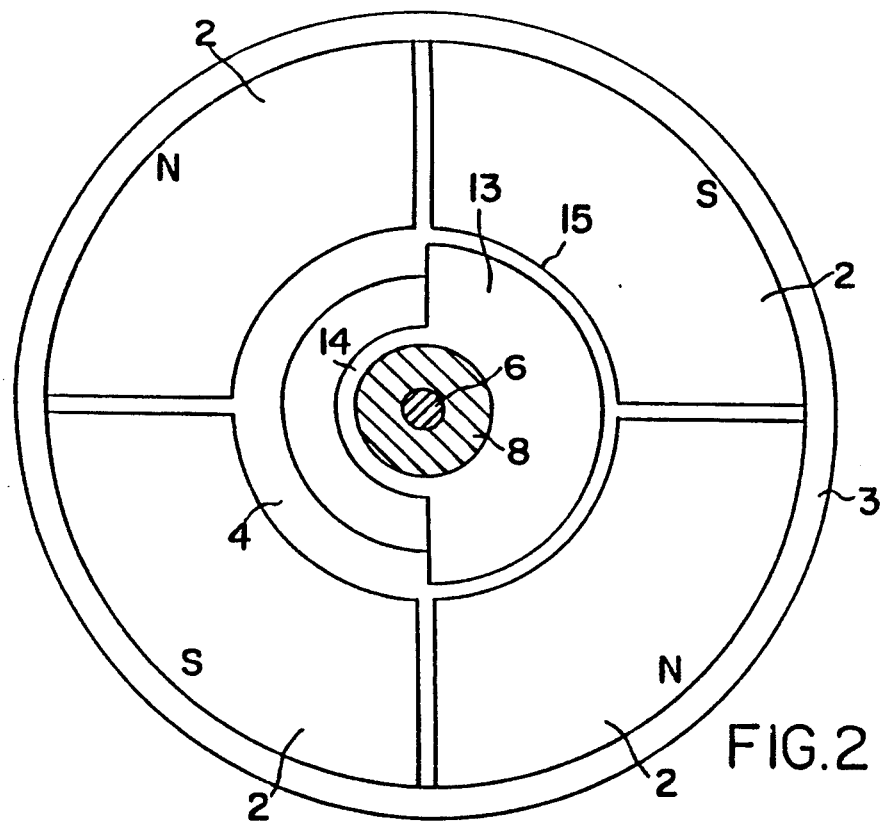
FIG. 2 is a section at a line II—II in FIG. 1.

FIG. 1 is an enlarged view of a miniature electric motor with a permanent magnetic rotor 1. As shown in FIG. 2, a rotor magnet 2 may consist of 4 magnet segments. The rotor magnet 2 is fastened concentrically within a holder 3, which may be a plastic injection molding or a pressure die casting.

The holder 3 includes a soft magnetic disk 4 which bears on one face of the rotor magnet 2. The rotor magnet 2 is fastened to one face of the holder 3, while a fan wheel 5, which preferably takes the form of a molding cast in one piece together with the holder, for example, is placed at the other face of the holder 3. A shaft 6 is potted like the disk 4 and is thus fastened with the holder 3 so as to rotate together with it. However, the shaft 6 can also be fastened in the central bore in the holder 3 by means of a bonding agent, press fit or other means.

The stator 7 of the motor according to the present invention contains, inter alia, a bearing carrier 8. A central countersunk bore 16 is provided at the axially external face 10 of the bearing carrier 8, and the diameter of this bore exceeds that of a bearing bore 17. The countersunk bore 16 is sealed by a bearing plate 18 whose external diameter is secured against axial displacement. The end of the shaft 6, which takes the form of a rounded trip 19, is brought to bear on the plate 18 under the effect of axial magnetic traction. A retaining ring 20 on the shaft 6 prevents the rotor from falling out. A housing shell 9 with a flat base 21 and an essentially cylindrical perimeter 22 is fastened to the outer casing of the bearing carrier 8. An iron core 11, potted in a plastic casing 23, bears on the base 21. A control magnet 24 is arranged opposite and radially around the outer perimeter of the face of the iron core 11 remote from the base 21, and the control magnet also forms an integral part of the plastic casing 23.

An active winding 12 and a disk of dynamo sheet metal are fastened in turn on the outer casing of the bearing carrier 8. Said disk consists of a D-shaped part 13 and a semi-circular locating ridge 14.

The outer diameter of the semi-circular D-shaped part is preferably no greater than the inner diameter 15 of the rotor magnet 2 and this disk (13, 14) is positioned axially between the end of the winding head 12 and one face of the rotor magnet 2. The purpose of this arrangement is to allow the lateral effect of the force generated as a result of the eccentric configuration of the magnetic circuit to be applied axially at a point approximately mid-way between two bearing surfaces 30, 40 of the shaft 6. "Edge" running is prevented and the service life of the bearings is thus extended.

FIG. 2 shows a view along a line II—II in FIG. 1 of the configuration of the disk 13, 14 whose arrangement and shape are responsible for the asymmetry of the magnetic circuit. No further details of the motor are shown here because the present invention can be employed in motors of various designs.

In the example according to the present invention shown in FIGS. 1 and 2 a brushless dc motor is employed, with a permanent magnet rotor 1 and an active winding 12 providing motive power, which is energized in a single or dual pulse mode to generate an ac exciter field on the stator, and which, in conjunction with at least one soft magnetic and/or permanent magnetic component on the stator, creates one defined starting position for the rotor magnet as well as reluctance torque.

To eliminate disruptive jerky movement of the poles, the D-shaped part of the disk covers one pair of poles or a whole-number multiple thereof (up to a maximum of p-1).

In a bipolar motor, only one of the poles is preferably covered, whereby a corresponding degree of pole jerk must be accepted; however, even this arrangement provides lower running noise.

Figure 3:
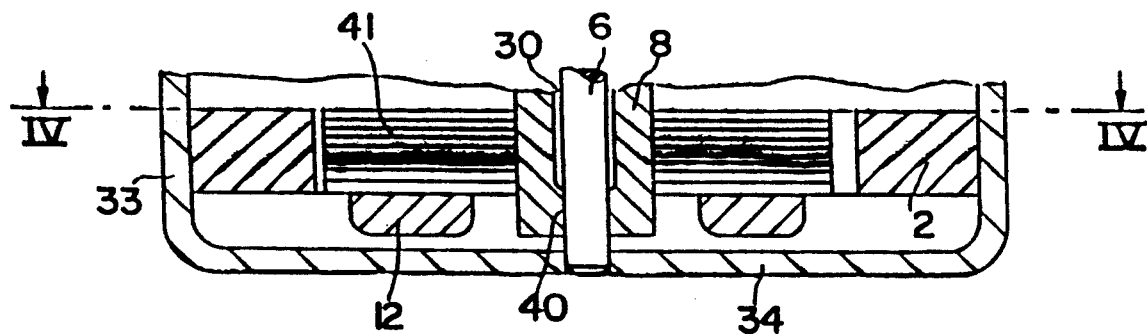
FIG. 3 is a section at a line III—III of a further embodiment of a motor according to the present invention with a cylindrical air gap.
Figure 4:
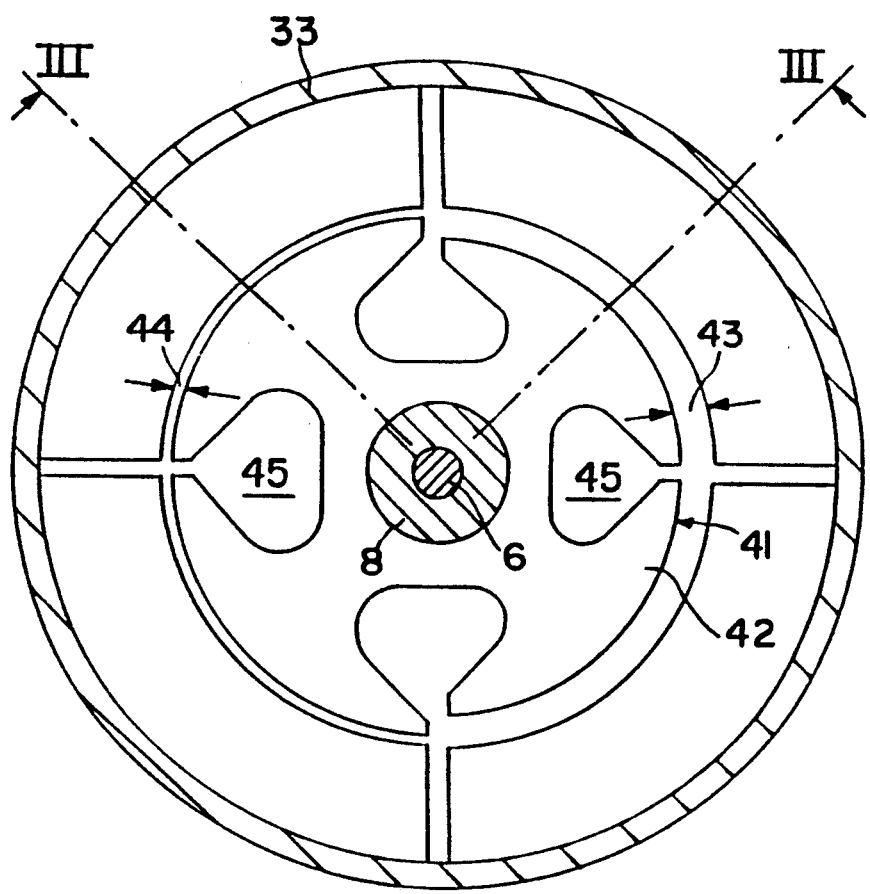
FIG. 4 is a section at IV—IV in FIG. 3, omitting the winding.

FIG. 3 shows a further embodiment of the present invention in the form of a slotted electronically commutated outer rotor motor with a cylindrical air gap. A rotor bell 33 encompasses the four segments of the rotor magnet 2. The shaft is firmly fastened at the center of the base 34 of the rotor bell 33. A stator stack 41, provided with stator laminations 42 whose eccentric outline can be seen in FIG. 4, is fastened on the bearing carrier part 8, whose configuration corresponds to that shown in FIG. 1. The diameter of one of the two pairs of poles in this four-pole version is smaller than the other. This arrangement also results in a wider air gap 43 on one side and a narrower air gap 44 on the other. The eccentric configuration of the magnetic circuit provides a resultant lateral force which is applied between the bearing points, and the shaft consequently exerts a pressure on the bearing points 30, 40 in the same direction. The effective winding 12, which essentially fills the slots 45, has been omitted from FIG. 4. Said lateral force will also be generated even if only some of the stator laminations are arranged asymmetrically in the stator stack. Furthermore, a stator stack with symmetric laminations and an eccentric center bore (not shown) can be used also to generate the lateral force referred to above in further detail.

The provision of suitable changes to the outer coutour of the rotor, such as a steel disk arrangement, for example, (similar to that shown as disk 13, 14), will result in the exertion of the required lateral force on the bearing points.

In mechanically commutated (mainly bipolar) motors the exertion of a lateral force on the bearing points can be obtained by the provision of systematic eccentricity between the armature and the steel magnet.

Figure 5:
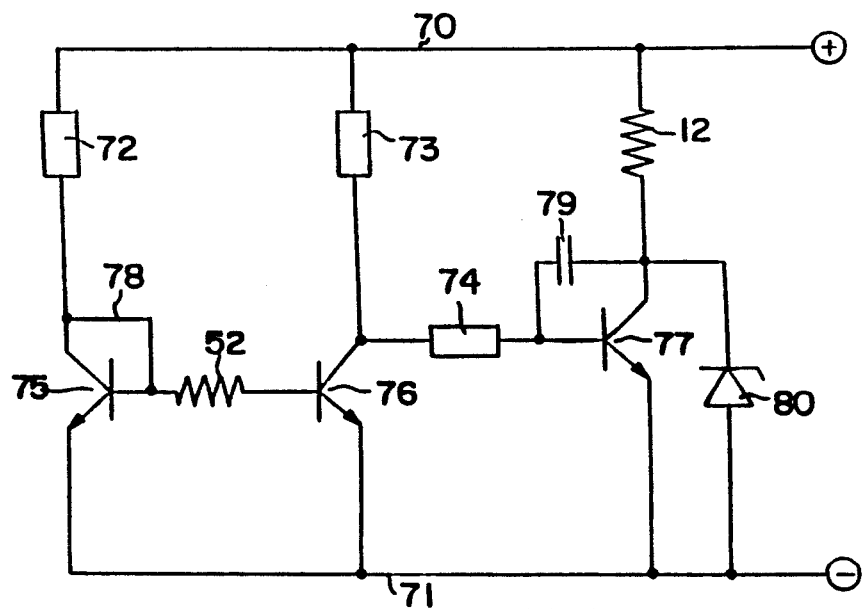
FIG. 5 is a first wiring diagram.

FIG. 5 shows a circuit for operation of the motor according to this invention. The power is supplied through lines 70, 71. Part of this circuit is designed as a so-called current level circuit and consists of resistors 72, 73 and transistors 75, 76. The current flowing through resistor 72 is the same as the current flowing through resistor 73 when the voltage on a tachometer winding 52 is equal to 0. As long as the tachometer voltage is 0, the collector potential (transistor 76) is at approximately half operating voltage, i.e., transistor 75 is conducting. This assures that the motor will start. As soon as the motor is turning, a voltage is induced in tachometer winding 52. Transistor 76 and transistor 77 are thus switched on and off in proper phase so the required pulsating current can flow in stator winding 12.

A capacitor 79 and resistor 74 form an RC element that suppresses voltage interference and reduces the steepness of the current flanks so this yields a further improvement in running noise. A zener diode 80 provides the high voltage protection and reverse polarity protection.

Capacitor 61 in FIG. 3 of West German application P 38 38 367.5 can be omitted because it has been found that in many applications high frequency voltage interference does not occur. By eliminating this capacitor 61, it is possible to increase expenditures elsewhere in the circuit (FIG. 5). Thus, for example, resistor 72 has been inserted between plus line 70 and transistor 75. Transistor 75 becomes a component that assumes the function of diode 53 in FIG. 3 of the application P 38 38 367.5 by means of a line 78 (short-circuit collector/base of transistor 75). By using the transistor 75 instead of diode 53, no cost is saved but a greater simplification is achieved. Three identical components (transistors 75, 76, 77) can be used. Transistor 76 is used to amplify the tachometer signal from tachometer winding 52.

The current for the transistor 75 is adjusted with resistor 72. It is advantageous for good startup properties of the motor (stator coil 21) that resistor 73 be designed smaller than resistor 72, e.g., about half the size of the latter.

The better startup properties of the motor are necessary especially under extreme conditions (e.g., temperatures from −40° C. and/or at a low voltage of about 5 V) which can occur with an automobile, for example, whose power supply is provided by a 12 volt battery.

Figure 6:
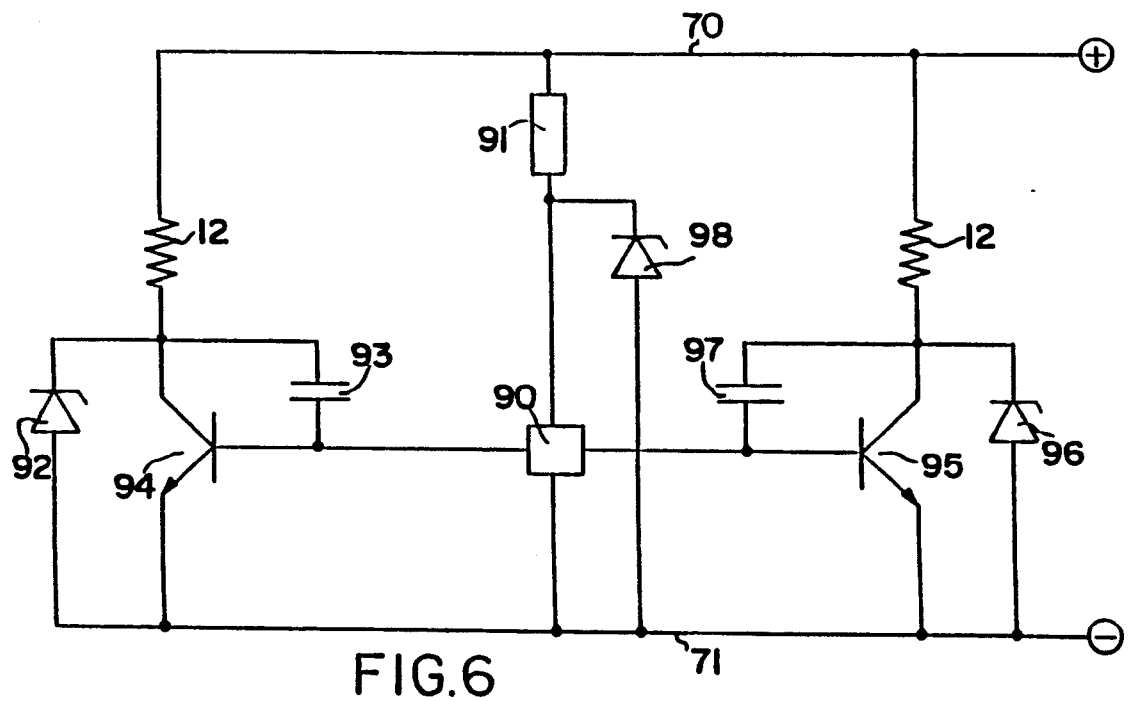
FIG. 6 is a second wiring diagram for operation of a motor according to this invention.

FIG. 6 shows another operating circuit. The stator coil here consists of coils 12, which are preferably bifilar or double-wound and are designed as one coil. The two coils 12 are alternately switched on by a Hall-IC 90 by way of transistors 94 and 95. Capacitors 93 and 97 assure a shallow increase in current and drop in current and when the operating circuit is designed as an IC-IC-internal resistors fulfill this function. This results in a reduction in noise in running and prevents voltage interference. Zener diodes 92, 96 and 98 together with a series resistor 91 and winding resistors provide reverse polarity protection and high voltage strength.

We claim:

1. Circuit for operation of a single-pulsed brushless dc electric motor having a permanent magnetic rotor, an effective working winding, and a tachometer winding, the effective working winding being energized to create a single-pulsed energizing field on the stator, and wherein one end of the tachometer winding is connected to the base of a first transistor whose collector is connected in series with a first resistor, the other end of the tachometer winding is connected to the base of a second transistor whose collector is connected in series with a second resistor, the first and second transistors are identical, and a shunt line short-circuits the collector/base of the first transistor.

2. Circuit according to claim 1, further including a third transistor identical with the first and the second transistors.

3. Circuit according to claim 2, wherein the second resistor is designed so its value is about half as great as that of the first resistor.

4. Circuit according to claim 1, wherein the second resistor is designed so its value is about half as great as that of the first resistor.

* * * * *